(12) United States Patent
Melton et al.

(10) Patent No.: US 9,771,205 B2
(45) Date of Patent: *Sep. 26, 2017

(54) INSULATED DOUBLE WALLED DRINKING VESSELS AND METHODS OF MAKING THE SAME

(71) Applicant: Tervis Tumbler Company, North Venice, FL (US)

(72) Inventors: Thomas Melton, Englewood, FL (US); Thomas Fulton, Sarasota, FL (US)

(73) Assignee: Tervis Tumbler Company, North Venice, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,089

(22) Filed: Jan. 19, 2017

(65) Prior Publication Data
US 2017/0129686 A1 May 11, 2017

Related U.S. Application Data

(63) Continuation of application No. 14/837,570, filed on Aug. 27, 2015, now Pat. No. 9,578,981, which is a (Continued)

(51) Int. Cl.
| | |
|---|---|
| *A47G 19/22* | (2006.01) |
| *B65D 81/38* | (2006.01) |
| *B29C 45/00* | (2006.01) |
| *B29C 45/16* | (2006.01) |
| *B29C 65/08* | (2006.01) |
| *B29L 31/00* | (2006.01) |

(52) U.S. Cl.
CPC ..... *B65D 81/3869* (2013.01); *A47G 19/2227* (2013.01); *A47G 19/2255* (2013.01); *A47G 19/2288* (2013.01); *B29C 45/006* (2013.01); *B29C 45/1657* (2013.01); *B29C 65/08* (2013.01); *B29L 2031/7132* (2013.01)

(58) Field of Classification Search
CPC .......................... A47J 19/2205; A47J 19/2288
USPC ....................................... 220/592.16, 592.17
See application file for complete search history.

(56) References Cited

U.S. PATENT DOCUMENTS

| | | |
|---|---|---|
| 1,953,723 A | 4/1934 | Quante |
| 2,580,043 A | 12/1951 | Paige |

(Continued)

OTHER PUBLICATIONS

International Search Report of PCT Application No. PCT/US2015/027890 dated Jul. 30, 2015.

(Continued)

*Primary Examiner* — Anthony Stashick
*Assistant Examiner* — Raven Collins
(74) *Attorney, Agent, or Firm* — Caesar Rivise, PC

(57) ABSTRACT

An insulated drinking vessel, e.g., a wine glass, and a method of making the same is disclosed. The drinking vessel basically comprises an outer vessel, an inner vessel and a ring. The inner and outer vessels each include a sidewall. The sidewalls are spaced apart. At least one of the outer vessel, the inner vessel and the ring are pre-molded to form an integral structure having a vestige of a molding gate used to mold the integral structure. At least one of the inner and outer vessels and the ring is molded in situ on the integral structure to cause portions thereof to melt and intermingle to form a non-superficial homogenous joint, with the ring forming the rim or lip of the insulated drinking vessel.

20 Claims, 4 Drawing Sheets

Related U.S. Application Data continuation-in-part of application No. 14/696,907, filed on Apr. 27, 2015, now Pat. No. 9,451,842, which is a continuation-in-part of application No. 14/694,363, filed on Apr. 23, 2015.

(60) Provisional application No. 61/987,147, filed on May 1, 2014.

(56) References Cited

U.S. PATENT DOCUMENTS

| | | | |
|---|---|---|---|
| 3,247,302 | A | 4/1966 | Lewis |
| 3,827,925 | A | 8/1974 | Douglas |
| 4,550,849 | A | 11/1985 | Adsit |
| D289,484 | S | 4/1987 | Forquer et al. |
| 4,872,569 | A | 10/1989 | Bolte |
| 5,090,213 | A | 2/1992 | Glassman |
| 5,553,735 | A | 9/1996 | Kimura |
| 5,839,599 | A | 11/1998 | Lin |
| 6,050,443 | A | 4/2000 | Tung |
| D449,962 | S | 11/2001 | Harrison et al. |
| 6,405,892 | B1 | 6/2002 | Volan |
| 6,419,108 | B1 | 7/2002 | Toida et al. |
| 6,921,179 | B2 | 7/2005 | Ghanem |
| D519,785 | S | 5/2006 | Bodum |
| D526,848 | S | 8/2006 | Bodum |
| D557,561 | S | 12/2007 | Flowers et al. |
| 7,306,113 | B2 | 12/2007 | El-Saden et al. |
| D614,448 | S | 4/2010 | Cahen |
| D680,376 | S | 4/2013 | Romley |
| D693,176 | S | 11/2013 | Kaiser |
| D698,200 | S | 1/2014 | Lauwagie |
| 8,684,223 | B1 | 4/2014 | Kalamaras |
| D720,185 | S | 12/2014 | Kaiser |
| D742,173 | S | 11/2015 | Perman |
| D742,177 | S | 11/2015 | Morris, II et al. |
| D744,280 | S | 12/2015 | Chiang |
| D758,792 | S | 6/2016 | Karussi |
| 9,451,842 | B2 | 9/2016 | Melton et al. |
| 2003/0029876 | A1 | 2/2003 | Giraud |
| 2004/0212120 | A1 | 10/2004 | Giraud |
| 2005/0045643 | A1 | 3/2005 | Ghanem |
| 2005/0173044 | A1 | 8/2005 | Drummond et al. |
| 2005/0173365 | A1 | 8/2005 | Mcknight |
| 2005/0194340 | A1 | 9/2005 | Huang |
| 2008/0210694 | A1 | 9/2008 | Castonguay |

OTHER PUBLICATIONS www.BedBathandBeyond.com, Tervis 9oz. Wine Glass, downloaded on Sep. 26, 2016.

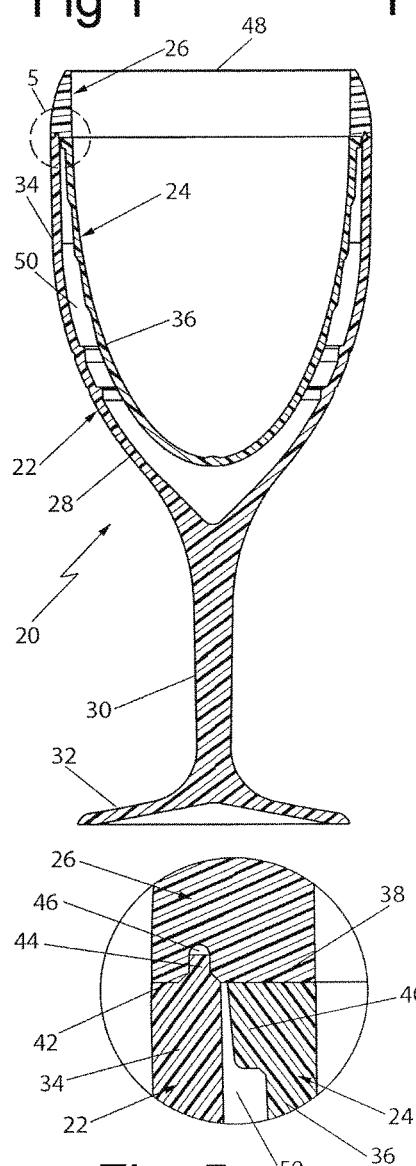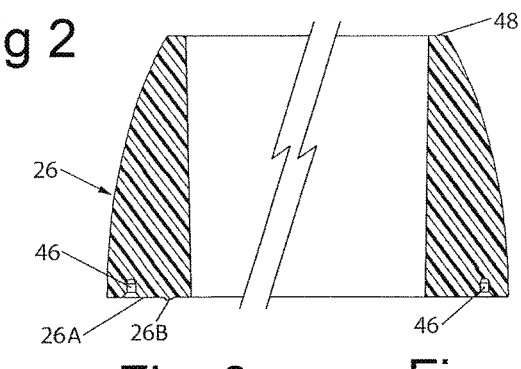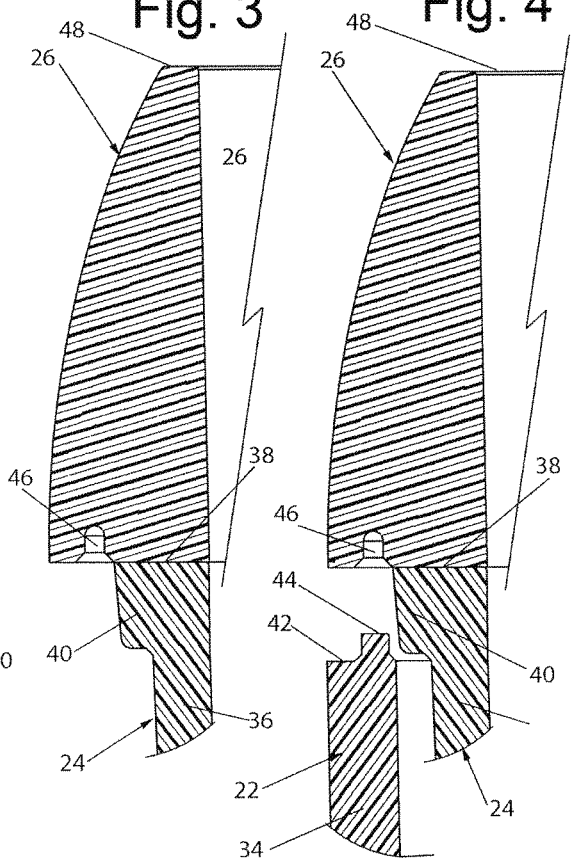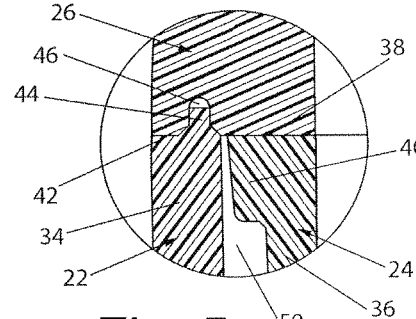

INSULATED DOUBLE WALLED DRINKING VESSELS AND METHODS OF MAKING THE SAME

CROSS-REFERENCE TO RELATED APPLICATIONS

This application is a continuation of U.S. application Ser. No. 14/837,570, filed on Aug. 27, 2015 entitled Insulated Double Walled Drinking Vessels and Methods of Making the Same, which in turn is a continuation-in-part of U.S. application Ser. No. 14/696,907, filed on Apr. 27, 2015 entitled Insulated Doubled Walled Drinking Vessel And Method Of Making The Same, now U.S. Pat. No. 9,451,842, which in turn is a continuation-in-part of U.S. application Ser. No. 14/694,363, filed on Apr. 23, 2015 entitled Insulated Doubled Walled Drinking Vessel And Method Of Making The Same, which in turn claims priority from U.S. Provisional Application No. 61/987,147 filed on May 1, 2014 entitled Insulated Doubled Walled Drinking Vessel And Method Of Making The Same. The entire disclosures of all of the foregoing applications are incorporated by reference herein.

FIELD OF THE INVENTION

This invention relates generally to drinking vessels and more particularly to insulated drinking vessels having a thin rim and methods of making the same.

BACKGROUND OF THE INVENTION

Double walled insulated drinking vessels are commercially available from various vendors. There are also numerous U.S. Patents and published patent applications directed to doubled walled insulated drinking vessels, such as glasses, mugs, goblets, wine glasses and the like. See for example, U.S. Patents and published applications: U.S. Pat. No. 4,872,569 (Bolte); U.S. Pat. No. 5,090,213 (Glassman); U.S. Pat No. 5,553,735 (Kimura); U.S. Pat. No. 5,839,599 (Lin); U.S. Pat. No. 6,050,443 (Tung et al.); U.S. Pat. No. 6,405,892 (Volan); U.S. Pat. No. 6,419,108 (Toida et al.); U.S. Pat. No. 6,921,179 (Ghanem); U.S. Pat. No. 7,306,113 (El-Saden et al.); D519,785 (Bodum); D526,848 (Bodum); D557,561(Flowers et al.); 2004/0212120 (Giraud); 2005/0045643 (Ghanem); 2005/0173365 (McKnight); and 2005/0194340 (Huang).

While the insulated drinking vessels of the foregoing prior art may be generally suitable for their intended purposes, a need exists for drinking vessel which has a thin, but relatively long, drinking lip. The subject invention addresses that need by providing insulated drinking vessels and method of making those vessels. The drinking vessels are formed of an inner vessel component, and outer vessel component and a ring component, one of which is molded in-situ on the other two components which are preferably pre-molded components.

SUMMARY OF THE INVENTION

In accordance with one aspect of this invention an insulated drinking vessel is provided. The insulated drinking vessel comprises a first component, a second component and a third component. The first component is an inner vessel. The second component is an outer vessel. The third component is a ring. Two of the first, second and third components are pre-molded of a plastic material. Two of the first, second, and third components are fixedly secured together by a weld joint to form an integral unit. One of the two components being pre-molded and having a surface which may include a vestige of a molding gate used to mold the one of the two components. Another of the first, second and third components is molded in situ on the one of the components to cause portions thereof to melt and intermingle to form a non-superficial homogenous joint therebetween. The outer vessel has a sidewall. The inner vessel has a sidewall. The sidewall of the inner vessel is spaced from the sidewall of the outer vessel. The ring forms the lip of the drinking vessel.

In accordance with one exemplary embodiment of the invention, the inner vessel has a top edge portion, the outer vessel is a pre-molded plastic component having a top edge portion, and the ring is a pre-molded component having a bottom edge portion which may include a vestige of a molding gate used to form the ring. The inner vessel is molded in-situ on the bottom edge portion of the pre-molded ring cause the plastic material thereof to fuse together and intermingle with the plastic material of the ring to form a non-superficial homogenous joint eliminating the visible appearance of the vestige. The top edge portion of the outer vessel is fixedly secured to the bottom edge portion of the ring at a weld joint.

In accordance with another exemplary embodiment of the invention, the inner vessel is a pre-molded component having a top portion and the outer vessel is a pre-molded component having a top portion. The inner vessel and the outer vessel are joined together by a weld joint at the top portions thereof to form a pre-molded unitary structure having a top edge portion which may include a vestige of a molding gate used to mold at least one of the inner and outer vessels. The ring comprises a plastic material molded in-situ on the top edge portion of the pre-molded unitary structure to cause the plastic material of the ring to fuse together and intermingle with the plastic material of the pre-molded unitary structure to form a non-superficial homogenous joint eliminating the visible appearance of the vestige.

In accordance with a preferred aspect of this invention the weld joint comprises an annular projection located within an annular recess.

In accordance with a preferred aspect of this invention the ring is thin and relatively long, and may be optionally colored, while the inner and outer vessels are transparent. A decorative item may be located within the insulating air space.

Another aspect of this invention constitutes a method of making an insulated double walled drinking vessel comprising an inner vessel, an outer vessel and a ring. The method basically entails providing an outer vessel pre-molded of a plastic material and having a top edge portion. A ring pre-molded of a plastic material and having a bottom edge portion is also provided. The inner vessel is molded of a plastic material in-situ on the bottom edge portion of the ring to cause the plastic material thereof to fuse together and intermingle with the plastic material of the ring to form a non-superficial homogenous joint at a bottom edge portion of the ring.

If the ring includes any vestige of a gate used to mold the ring, the homogeneous joint resulting from the in-situ molding of the inner vessel on the ring eliminates the visible appearance of that vestige. Thus, another aspect of the method of this invention entails pre-molding the ring in a manner to ensure that any vestige of the molding gate used to mold the ring is located on the bottom edge portion of the ring.

Another aspect of this invention constitutes another method of making an insulated double walled drinking vessel comprising an inner vessel, an outer vessel and a ring. The method basically entails providing an outer vessel pre-molded of a plastic material and having a top portion and providing an inner vessel of pre-molded of a plastic material and having a top portion. The top edge portion of said inner vessel is fixedly secured to the top edge portion outer vessel by a weld joint to form a unitary structure having a top edge portion which may include a vestige of a molding gate used to mold at least one of the inner and outer vessels. A ring of plastic material is molded in-situ on the top edge portion of the pre-molded unitary structure to cause the plastic material of the ring to fuse together and intermingle with the plastic material of the pre-molded unitary structure to form a non-superficial homogenous joint eliminating the visible appearance of the vestige. The ring forms the lip of said drinking vessel.

DESCRIPTION OF THE DRAWING

FIG. 1 is vertical sectional view of one exemplary insulated drinking vessel, e.g., a wine glass, constructed in accordance with this invention;

FIG. 2 is an enlarged vertical sectional view of the ring component making up the top portion of the wine glass shown in FIG. 1;

FIG. 3 is a more enlarged sectional view of the top portion of the wine glass shown during one step in the making thereof pursuant to a method of this invention;

FIG. 4 is an enlarged sectional view, similar to FIG. 3, but showing the top portion of the wine glass at a further step in the method of making the wine glass;

FIG. 5 is an enlarged sectional view of the portion of the wine glass shown within the circle designated as 5 in FIG. 1;

DETAILED DESCRIPTION OF THE PREFERRED EMBODIMENT

Figure 6:
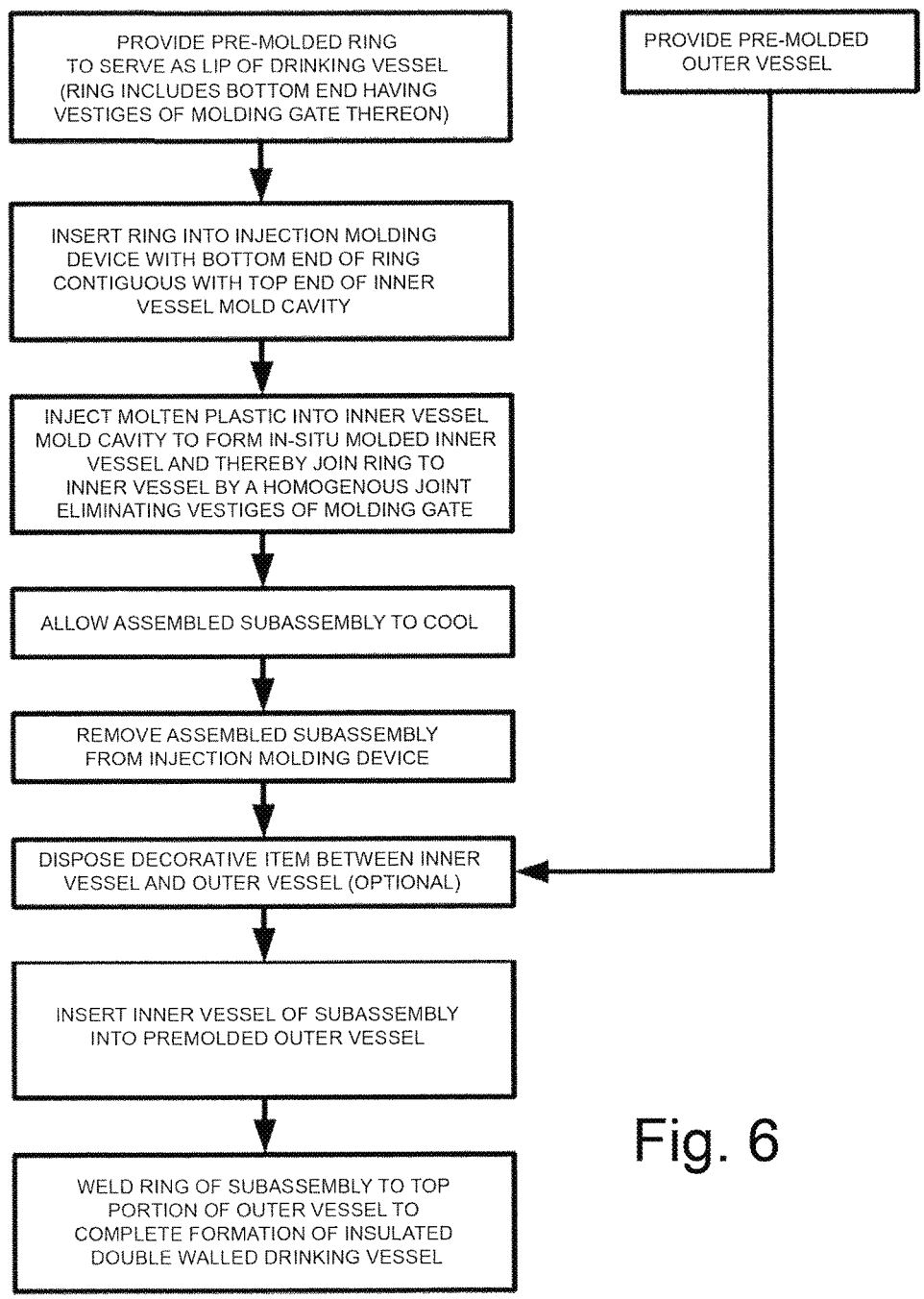
FIG. 6 is a block diagram of one exemplary method in accordance with this invention for making an insulated vessel, such as the wine glass shown in FIG. 1.

Referring now to the various figures of the drawing wherein like reference characters refer to like parts, there is shown at 20 in FIG. 1 one exemplary embodiment of an insulated drinking vessel, e.g., a stemmed wine glass, constructed in accordance with this invention. The wine glass 20 basically comprises an outer vessel 22, an inner vessel 24, and a ring 26. The outer vessel 22 is an integral unit that is pre-molded of any suitable transparent plastic material, e.g., Eastman Tritan™ copolyester sold by Eastman Chemical Company. By pre-molded it is meant that the component is made prior to its use in the assembly of the insulated vessel 20. The ring 26 is also a pre-molded component which forms the lip or rim of the wine glass 20 and includes a bottom surface 26A (FIG. 2). Any suitable conventional molding technique, e.g., blow molding, injection molding, etc., can be used to form the outer vessel and the ring, although injection molding is preferred. Unlike the outer vessel and the ring, the inner vessel is not a pre-molded component. Rather, as will be described in detail later, it is molded in-situ onto the bottom surface 26A of the ring 26 to form a subassembly, which is then welded to the outer vessel to complete the assembly of the wine glass 20, As is known when a component is injection molded there will be some surface portion thereof formed by the gate of the mold. This surface portion will typically exhibit a somewhat dissimilar appearance from the surface of the component not at the location of the gate, thereby detracting from the aesthetics of the molded component. Thus, in the interest of aesthetics, it is a common practice of the prior art to treat the surface area at the location of the gate to provide the same appearance as the remainder of the molded component.

The subject invention entails a method of making the wine glass 20 which effectively eliminates any vestiges of a molding gate on the ring 26 without requiring a separate surface treatment. To that end, it is of importance from an aesthetic standpoint that if the pre-molded ring has any vestiges e.g., protrusions, etc., of the molding gate, such vestiges be located on the bottom end surface 26A of the ring. In the exemplary embodiment one such vestige 26B is shown.

As mentioned above the inner vessel is molded in-situ onto the ring in accordance with a method of this invention. That method will be described in detail later and is illustrated by the block diagram of FIG. 6. Suffice it for now to state that the pre-molded ring 26 is placed within an injection molding machine (not shown), with a portion of the bottom surface 26A of the ring 26 facing and contiguous with the top of a mold cavity that is shaped like the inner vessel 24. A molten plastic material, preferably the same material as that from which the ring was pre-molded, is injected under pressure into the mold cavity to fill the mold cavity and thereby form the inner vessel 24. Moreover, and quite significantly, the molten injected plastic forming the inner vessel 24 also engages the exposed bottom surface of the ring to cause that surface to melt and reflow to a substantial depth, e.g., within the range of approximately 0.003 inch −0.100 inch (preferably within the range of approximately 0.030 inch −0.080) inch, whereupon the injected plastic intermingles with the melted plastic of the ring, to form a non-superficial homogenous joint thereat, thereby integrally joining the ring 26 to the in-situ molded inner vessel 24. This non-superficial homogeneous joint eliminates any vestige 26B of the molding gate, thereby resulting in joint having an aesthetically pleasing appearance, e.g., the joint appears invisible.

Thus, in accordance with a preferred aspect of the method of this invention the pre-molding of the ring 26 is accomplished so that vestige(s) the gate of the mold in which the ring is made is(are) located at the bottom surface 26A of the ring. By pre-molding the ring so that the gate is located at the undersurface 26A of the ring, no surface treatment of the vestige 26B needs to be undertaken with the subject invention, since the molding of the inner vessel in-situ on the undersurface of the ring will completely eliminate or obscure the residual appearance of the gate, i.e., the plastic material at the location of the gate will become molten and intermingle with the plastic material forming the inner vessel, thereby eliminating any vestige of the gate.

The mold cavity for the in-situ molding of the inner vessel can be of any suitable thickness and height to form the inner vessel. For example, the inside diameter of the mold cavity which forms the inner vessel 24 is preferably chosen to be slightly larger than the inside diameter of the ring, whereupon during the in-situ molding operation when pressure is applied to the plastic forming the inner vessel, the inner surface of the inner vessel will be flush with the inner surface of the ring 26.

Once the inner vessel has been molded in-situ on the ring, the resulting subassembly or unit of the ring and the inner vessel is allowed to cool to the point that it can be removed from the mold cavity and inserted into the pre-molded outer vessel, so that the inner vessel of the subassembly is located in the bowl portion (to be described later) of the outer vessel, with a top edge portion of the outer vessel abutting a portion of the bottom surface or edge of the ring. That assembly can then be brought to a welding machine, e.g., an ultrasonic welding machine, to weld the ring with the inner vessel to the outer vessel.

The abutting surfaces of the ring and outer vessel at which an ultrasonically welded joint is to be formed are preferably profiled or shaped in such a manner to concentrate the ultrasonic energy thereat to facilitate the formation of a good weld joint. Thus, the abutting surfaces of the ring and outer vessel preferably make use of a conventional interference (e.g., double shear) joint. Alternatively, those surfaces may make use of a triangular protrusion energy director (e.g., an upstanding triangular annular protrusion from one flange surface and an planar surface on the other flange) or any other conventional joints or profiling that are known to those skilled in the art of ultrasonic welding, to create a good ultrasonic weld joint. In the exemplary embodiment shown and which will be described later, the abutting surfaces are in the form of a double shear, e.g., tongue and groove, joint.

Once the assembly of the outer vessel and the ring with its attached inner vessel is located in the ultrasonic welding machine, its horn or sonotrode can be applied to the top edge of the ring to produce a far field weld at the interface of the ring and the outer vessel, thereby completing the vessel 20. The resulting vessel exhibits the same properties as if it had been molded as an integral unit at one time, e.g., it exhibits the same resistance to breakage or other damage at the location of the joints between the ring and the inner and outer vessels as remainder of the unit.

The details of the exemplary wine glass 20 will now be described. Thus, as best seen in FIG. 1, the outer vessel includes a bowl shaped portion 28, a stem 30 and a flanged base 32. The bowl shaped portion 28 has a sidewall 34 that is a surface of revolution and can be of any desired shape. In the exemplary embodiment it is shown as being arcuate. The inner vessel 24 is generally bowl shaped and includes an arcuate sidewall 36. The sidewall 36 is also a surface of revolution and can be of any desired shape. In the exemplary embodiment it is also arcuate. As best seen in FIGS. 2-4, the upper end of the sidewall 36 is in the form of an outwardly directed annular flange 40.

As mentioned above the abutting surfaces of the ring and outer vessel at which the ultrasonic joint is to be formed are preferably in the form of a double shear, e.g., tongue and groove, interference joint. To that end, as best seen in FIGS. 3 and 4, the top edge or upper surface 42 of the sidewall 34 of the outer vessel 22 includes an annular wall 44 projecting upward therefrom. The annular wall 44 is chamfered at the point where it merges with the top surface 42 and forms the tongue of the tongue and groove joint. The height of the annular walls is preferably within the range of 0.025 inch to 0.050 inch (and most preferably 0.04 inch). The thickness of the annular wall is preferably within the range of 0.025 inch to 0.05 inch (and most preferably 0.040 inch). The annular wall or tongue 44 is arranged to be disposed within a correspondingly shaped groove to form the tongue and groove interference joint. That groove is in the form of an annular recess 46 located in the portion 42 of the planar bottom surface 26A of the ring 26. The annular recess 46 is correspondingly shaped to the annular wall 44 and includes a chamfered entryway contiguous with the undersurface portion 42.

While not preferable, the tongue and groove interference joint can alternatively be formed by having the annular groove 46 in the top edge of the outer vessel 22 and the annular wall 44 project downward from the undersurface portion 42 of the ring 26. In fact, as mentioned above the abutting surfaces of the ring and the outer vessel may include other features or profiles to concentrate the ultrasonic welding energy thereat in lieu of the exemplary tongue and groove joint.

The welding of the ring to the outer vessel is accomplished by placing the horn or sonotrode of an ultrasonic welding device onto the top surface 48 of the ring 26 to focus and direct the ultrasonic energy to the engaging surfaces of the annular wall 44 and annular recess 46. Since the ring has a height of up to approximately 1 inch the weld produced is constitutes what could be called a "far-field" weld. During the welding operation, the annular wall 44 melts and flows into the annular recess 46 to form a strong welded joint therebetween, like shown in FIG. 5.

When the ring 26 with the inner vessel 24 is welded to the outer vessel as just described the outer surface of the sidewall 36 of the inner vessel 24 is spaced from the inner surface of the sidewall 34 of the outer vessel 22 to form an insulating air space 50 therebetween. If desired, an optional, decorative item, e.g., a wrap, an embroidered emblem or patch, etc., (not shown) can be disposed in the air space prior to the welding of the components to provide enhanced aesthetics for the vessel 20. Irrespective of the construction of the decorative item, since it is disposed within the air space 50 and the sidewall of the outer vessel 22 is transparent, it will be visible through the transparent sidewall to provide enhanced aesthetics to the insulated vessel 20. Moreover, in the interest of aesthetics, the material forming the ring 26 may be colored to accentuate the rim and to coordinate with the ornamentation provided by the decorative item with in the insulated air space. For example, the decorative item within the air space may be a wrap or embroidered patch bearing a college logo in the college's colors, with the ring being colored to match one of the college's colors for emphasis.

If the insulated vessel is something other than a wine glass, e.g., is a bottle, a helical thread may be provided on the outer surface of the ring 26 to accommodate a threaded cap or lid for the insulated vessel. To that end, the mold cavity in which the ring is pre-molded may include helical thread forming portion contiguous with the portion of the cavity forming the outer surface of the ring. Alternatively, the ring may be formed with an internal helical thread for a cap or lid. In such a case, the mold cavity may include helical thread forming portion contiguous with the portion of the cavity forming the inner surface of the ring. Other features can be molded into the ring during its formation, e.g., the top edge of the ring may include a portion of elevated height to form an enlarged lip for facilitating the drinking of a beverage from the vessel. A straw holder, not shown, may also be formed in the ring as the ring is molded.

As mentioned above the method of making the insulated wine glass 20 (or any other double walled insulated drinking vessel constructed in accordance with this invention) constitutes another aspect of this invention. To that end, as best seen in FIG. 6, the method entails providing a pre-molded ring formed of a plastic material. That ring is constructed as discussed earlier. The ring is inserted into the injection molding machine so that it is at the top of the injection molding machine's cavity for forming the inner vessel with its bottom surface 26A contiguous with the portion of the mold cavity for forming the inner vessel. The geometry of the molding machine cavity is such that a leak proof seal is created inside the cavity when the mold is closed. This is accomplished by making the portion of the cavity that the ring is nested in of a smaller diameter by at least 0.004 inch than the inner diameter of the portion of the cavity forming the inner surface of the inner vessel. Moreover, it is desirable to have the mold cavity produce a land length of at least 0.060 inch.

The inner vessel is then molded in-situ on the bottom edge portion of the pre-molded ring, whereupon the heat and pressure applied causes the plastic material forming the inner vessel to fuse together and intermingle with the re-flow (melted) plastic material of the ring to form a non-superficial homogenous joint and with the inner vessel having an inner surface that is flush with the inner surface of the ring vessel. Moreover, the gating of the inner vessel should be placed in such a way as to give maximum heat to the re-flow area. Thus, it is preferably located as close to the inner re-flow area as possible. The parameters of the injection molding process are set in a way to create enough shear heat to re-flow the top surface of the inner vessel to form the non-superficial homogeneous joint. For example, in accordance with one exemplary process of this invention, barrel heats are set to a range between 530-560 degrees F. and pack and hold cavity pressures are between approximately 10,000 PSI to 12,000 PSI.

After the in-situ molding process is complete, the assembled unit or subassembly of the ring and inner vessel is allowed to cool within the injection molding machine until the molten plastic has solidified sufficiently that the subassembly can be removed to be welded to the outer vessel. To that end, the inner vessel 24 of the subassembly is placed within the interior of the bowl shaped portion 28 of the outer vessel, such that the annular wall 44 of the outer vessel is juxtaposed opposite the annular groove 46 in the undersurface 42 of the ring 26 as shown in FIG. 4. Those surfaces can then be brought into abutment with each other with the sonotrode of the ultrasonic welding machine engaging the top free edge or surface 48 of the ring 26 to apply pressure thereto and to focus and direct ultrasonic energy therefrom through the height of the ring to the engaging surfaces of the annular wall 44 and annular recess 46, to cause those surface to melt and fuse to form a good joint like shown in FIG. 5. That action completes the vessel 20. Another vessel can then be made in a similar manner as just described.

It should be pointed out at this juncture that the structure of the insulated drinking vessel and method or making it as described above are merely exemplary of various structures and methods that are contemplated by this invention. Thus, for example, the insulated vessel 20 of this invention is not limited to wine glasses, but may be in the form of mugs, tumblers, bottles, etc. Moreover, the sidewall portions of the vessels may be of other shapes and sizes than that shown in the drawing. Further still, while the wine glass 20 has been described as being made by molding the inner vessel to the pre-molded ring and then assembling, e.g., welding, that subassembly to the outer vessel, it should be clear to those skilled in the art that the wine glass 20 (or any other double walled insulated drinking vessel) could be made by molding the outer vessel in situ on the pre-molded ring to form a subassembly and then inserting and welding a pre-molded inner vessel into that subassembly to complete the formation of the wine glass/drinking vessel.

Figure 7:
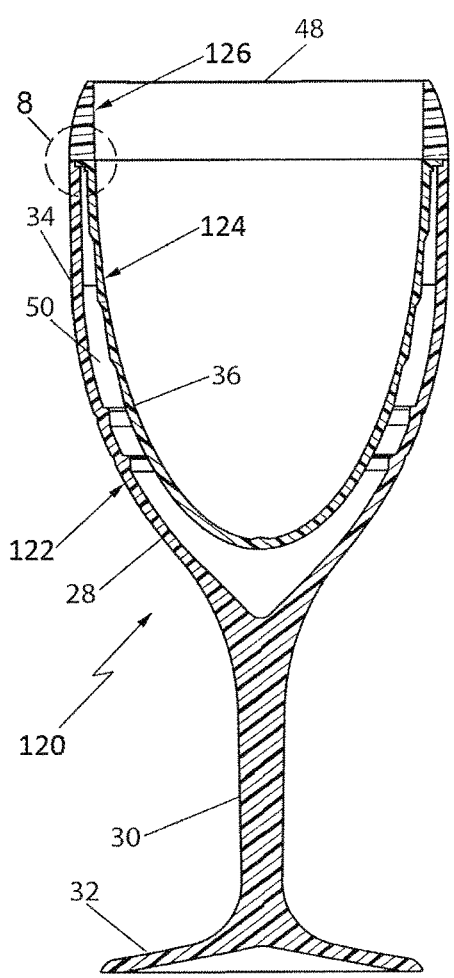
FIG. 7 is a vertical sectional view similar to FIG. 1, but showing another exemplary insulated drinking vessel, e.g., a wine glass, constructed in accordance with this invention.

In FIG. 7 there is shown an alternative preferred embodiment 120 of a wine glass constructed in accordance with this invention. The wine glass 120 is similar in construction to the wine glass 20 except for the features making up the region where the ring forming the rim of the wine glass joins the upper end portions of the inner and outer vessels. Thus, in the interest of brevity the components or features of the wine glass 120 which are common to the wine glass 20 will be given the same reference numbers and the details of the construction of those components will not be reiterated.

The wine glass 120, or any other double walled drinking vessel constructed in accordance with this invention, is preferably made in accordance with the method that somewhat different than the method described above. That other method is shown schematically in the block diagram of FIG. 9 and basically entails providing a subassembly of a pre-molded inner vessel disposed within a pre-molded outer vessel and molding a ring of plastic in-situ onto the top end portion of that subassembly, whereas the exemplary embodiment 20 is made by molding either the inner or outer vessel onto the pre-molded ring.

Figure 8:
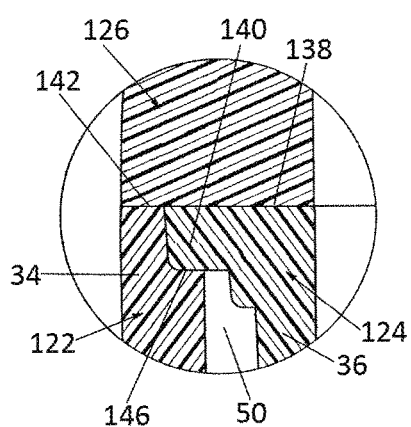
FIG. 8 is an enlarged sectional view of the portion of the wine glass shown within the circle designated as 8 in FIG. 7.

Turning now to FIGS. 7 and 8 it can be seen that the wine glass 120 is made up of an outer vessel 122, an inner vessel 124 and an annular ring 126. The outer vessel 122 includes a bowl shaped portion 28, a stem 30 and a flanged base 32. The bowl shaped portion 28 has a sidewall 34 that is a surface of revolution and can be of any desired shape. In the exemplary embodiment it is shown as being arcuate. The inner vessel 124 is generally bowl shaped and includes an arcuate sidewall 36. The sidewall 36 is also a surface of revolution and can be of any desired shape. In the exemplary embodiment it is also arcuate. The upper end of the sidewall 36 of the inner vessel is in the form of an outwardly directed annular flange 140 having a top surface 138. The upper end surface 142 of the sidewall 34 of the outer vessel 122 at the point where it meets the inner surface of the sidewall 34 is in the form of an annular recess or ledge 146. The recess 146 is configured to receive the annual flange 140 so that the outer surface of the sidewall 36 of the inner vessel will be spaced from the inner surface of the sidewall 34 of the outer vessel to form an insulating air space 50 therebetween. If desired, an optional, decorative item, e.g., a wrap, an embroidered emblem or patch, etc., like that described earlier can be disposed in that air space.

Figure 9:
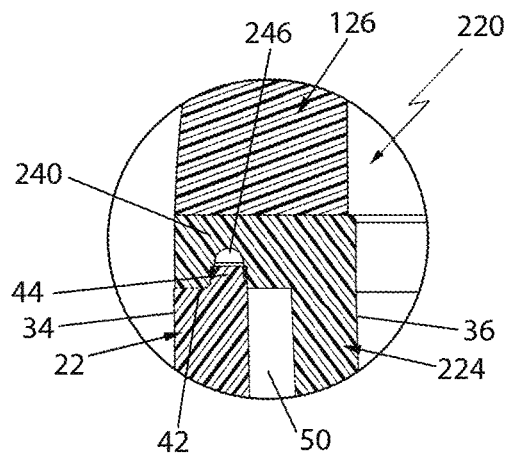
FIG. 9 is an enlarged sectional view, similar to FIG. 8, but showing a corresponding portion of a third embodiment of a wine glass constructed in accordance with this invention.

Turning now to FIG. 9, there is shown the details of a portion of an alternative embodiment of the wine glass 220. The wine glass 220 is constructed similarly to the wine glass 120 of FIG. 7, except for the details of the top end portions of its inner vessel and its outer vessel. In the interest of brevity the components or features of the wine glass 220 which are common to the wine glasses 20 and 120 will be given the same reference numbers and the details of the construction of those components will not be reiterated. Thus, it can be seen that the wine glass 220 includes an outer vessel 22, an inner vessel 224 and an annular ring 126. The outer vessel 22 of the wine glass 220 is identical in construction to the outer vessel 22 of the wine glass 20. Thus, upper end of the sidewall 36 of the outer vessel 22 includes an annular wall 44 projecting upward therefrom. The annular wall 44 is chamfered at the point where it merges with the top surface 42 of the outer sidewall to form the tongue of the tongue and groove double shear interference joint with the inner vessel. The top portion of the inner vessel 224 includes an outwardly projecting annular flange 240 having an undercut surface in which an annular recess 246 is located. The annular recess 246 is identical in construction to the annular recess 46 of the wine glass 20 and is correspondingly shaped to the annular wall 44 of the outer vessel 22. Thus the annular recess 246 includes a chamfered entryway contiguous with the undersurface of the flange 240.

Figure 10:
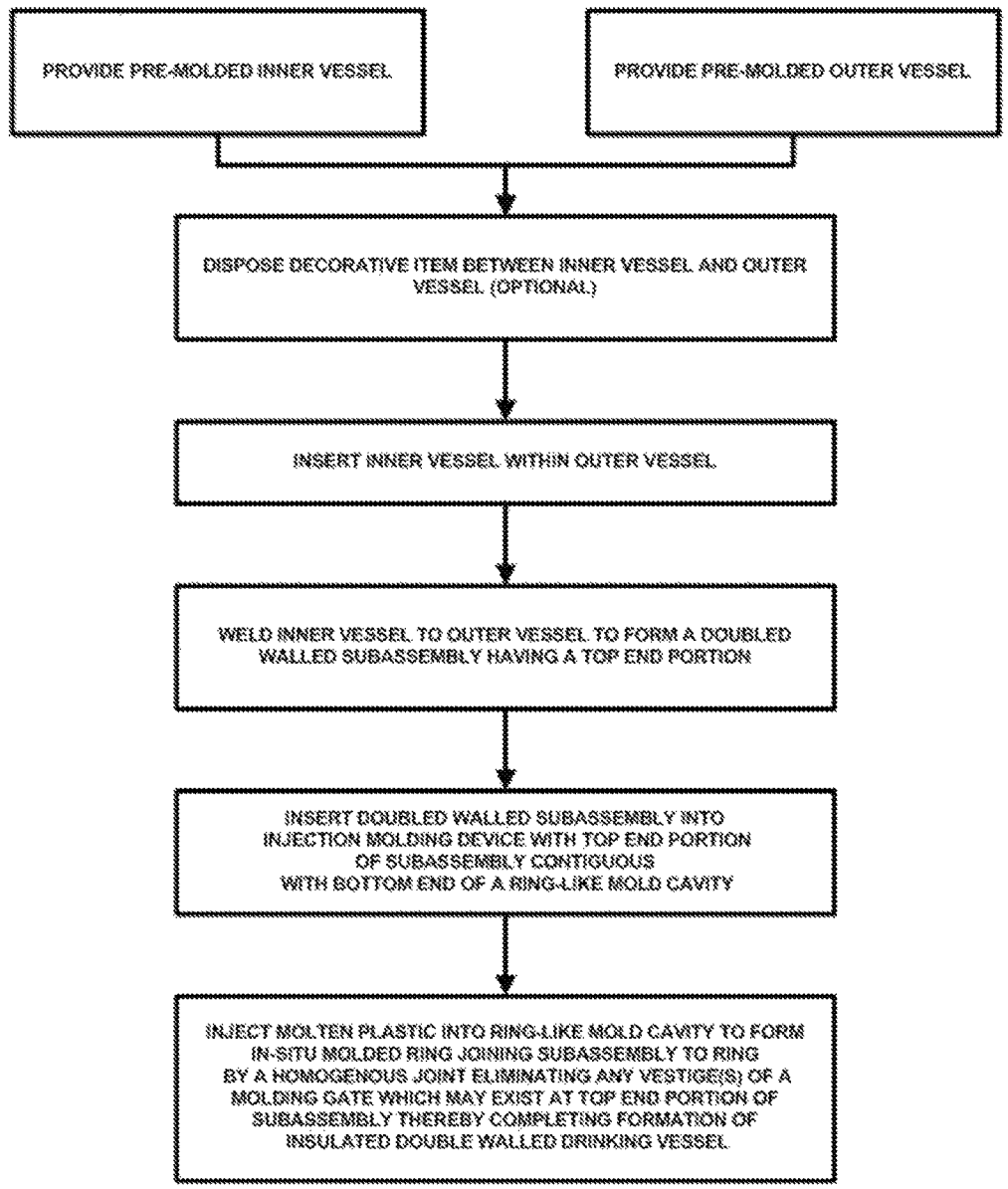
FIG. 10 is a block diagram of another exemplary method in accordance with this invention for making an insulated vessel, such as the wine glasses shown in FIGS. 7 and 9.

The method of making the wine glass 120 is as follows and is shown in the block diagram of FIG. 10. To that end, a pre-molded plastic inner vessel 124 constructed as described above and a pre-molded outer vessel 122 also constructed as described above are assembled together to form a subassembly with the inner vessel disposed within the interior of the bowl shaped portion 28 of the outer vessel 122 and with the annular flange 140 of the inner vessel 124 disposed within and in engagement with the annular recess 146 in the top edge 142 of the outer vessel 122. Preferably the inner vessel is secured to the outer vessel, such as by a weld joint at their abutting surfaces. However, it should be clear that the inner vessel and outer vessel need not be permanent secured together to form the subassembly since they will be permanently secured together when the ring 126 is molded in-situ on that subassembly, as will be described shortly. Thus, the inner vessel may merely be seated within the outer vessel or can be snap fit within the outer vessel.

If the subassembly is to be welded to permanently join the inner and outer vessels together before forming the ring on that subassembly, the welding operation can be readily accomplished by applying the sonotrode of the ultrasonic welding machine to the top surface 138 of the inner vessel 124 adjacent the location where the annular flange 140 is received in the annular recess 146 to apply pressure thereto and to focus and direct ultrasonic energy to the engaging surfaces. That action causes those surfaces to melt and fuse to form a good joint like shown in Fig.8, thereby joining the inner and outer vessels together into a permanent subassembly. The subassembly can then be inserted into an injection molding machine (not shown) so the top end, i.e., the contiguous surfaces 138 and 142 of the subassembly is located immediately below a ring-shaped annular cavity of the injection molding machine for forming the ring 126. The geometry of the molding machine cavity is such that a leak proof seal is created inside the cavity when the mold is closed. This is accomplished by making the portion of the cavity that the subassembly is nested in of a smaller diameter by at least 0.003 inch than the inner diameter of the portion of the cavity forming the inner surface of the ring. Moreover, it is desirable to have the mold cavity produce a land length of at least 0.080 inch.

The ring 126 is then molded in-situ on the top surface portion 138 and 142 of the subassembly, whereupon the heat and pressure applied causes the plastic material forming the ring to fuse together and intermingle with the re-flow (melted) plastic material of the subassembly to form a non-superficial homogenous joint and with the ring having an inner surface that is flush with the inner surface of the subassembly. Moreover, the gating of the ring should be placed in such a way as to give maximum heat to the re-flow area. Thus, it is preferably located as close to the inner re-flow area as possible. The parameters of the injection molding process are set in a way to create enough shear heat to re-flow the top surface of the subassembly to form the non-superficial homogeneous joint. For example, in accordance with one exemplary process of this invention, barrel heats are set to a range between 400-440 degrees F. and pack and hold cavity pressures are between approximately 800 PSI to 1200 PSI. The non-superficial homogeneous joint produced by molding the ring onto the subassembly will also have the effect of eliminating any vestige of the molding gate that was used to mold the inner and outer vessel, if the vestige of the molding gate was located on the top surface 138 of the inner vessel or on the top surface 142 of the outer vessel. Thus, the joint created between the ring 126 and the subassembly of the inner vessel and outer vessel will have an aesthetically pleasing appearance, e.g., the joint appears invisible.

If desired to enhance the structural integrity of the joint created between the ring 126 and the subassembly of the inner and outer vessels the top surface 138 and/or the top surface 142 may include an upstanding annular wall (like the wall 44) or may include an annular recess (like the recess 46) to provide more surface area for the ring 126 to engage and intermingle with when the ring is molded in-situ onto the subassembly.

In any case, as should be appreciated by those skilled in the art, the molding of the ring 126 onto the subassembly of the inner and outer vessels has the effect of permanently joining those vessels together, even if the subassembly of those two vessels had not been previously permanently secured together, e.g., welded. In particular, if the inner vessel had merely been located within the outer vessel to form a temporarily connected subassembly, the molding of the ring 126 in-situ on that subassembly will fixedly secure the vessels together. Thus, after the in-situ molding process is complete, the assembled unit is allowed to cool within the injection molding machine until the molten plastic has solidified sufficiently such that the unit can be removed. That action completes the vessel 120. Another vessel can then be made in a similar manner as just described.

It should be pointed out at this juncture, that the method of making the wine glass 220, or any other double walled drinking vessel, be it a tumbler, mug, etc., can be achieved in accordance with the method described above with respect to FIG. 10. In particular, a pre-molded plastic inner vessel 224 constructed as described above and a pre-molded outer vessel 22 also constructed as described above are assembled together to form a subassembly with the inner vessel disposed within the interior of the bowl shaped portion of the outer vessel and with the annular wall 44 of the outer vessel 22 disposed within and in engagement with the annular recess 246 in the undersurface of the flange 240 of the inner vessel 224. Those two engaging portions can then be welded together by applying the sonotrode of the ultrasonic welding machine to the top surface of the flange 240 to apply pressure thereto and to focus and direct ultrasonic energy to the engaging surfaces. That action causes those surfaces to melt and fuse to form a good joint like shown in Fig.9, thereby joining the inner and outer vessels together into a permanent subassembly. The subassembly can then be inserted into an injection molding machine and the ring 126 molded in-situ thereon in the same manner as described above with reference to the formation of the wine glass 120.

Without further elaboration the foregoing will so fully illustrate our invention that others may, by applying current or future knowledge, adopt the same for use under various conditions of service.

We claim:

1. A double walled vessel comprising:
   a) an outer vessel comprising a separate pre-molded component formed of a plastic material;
   b) an inner vessel; and
   c) a ring, wherein either one of said inner vessel and said ring also comprises a separate pre-molded component formed of a plastic material and being referred to as a second separate pre-molded component, and wherein the remaining one of said inner vessel and said ring which is not a separate pre-molded component being referred to as a final stage component, said outer vessel and said second separate pre-molded component being fixedly secured together by a weld joint to form an integral unit, said final stage component being molded in situ on either of said outer vessel or said second separate pre-molded component to cause portions thereof to melt and intermingle to form a non-superficial homogenous joint therebetween, said ring forming a lip of said double walled vessel.

2. The double walled vessel of claim 1 wherein said outer vessel has a top edge portion, said ring comprises said second separate pre-molded component having a bottom edge portion which may include a vestige of a molding gate used to form said ring, and wherein said inner vessel comprises said final stage component that is molded in-situ on said bottom edge portion of said pre-molded ring which causes the plastic material thereof to fuse together and intermingle with said plastic material of said ring to form a non-superficial homogenous joint eliminating the visible appearance of said vestige, said top edge portion of said outer vessel being fixedly secured to said bottom edge portion of said ring at a weld joint.

3. The double walled vessel of claim 2 wherein said weld joint comprises an annular projection located within an annular recess.

4. The double walled vessel of claim 2 wherein said weld joint comprises a far-field ultrasonically welded joint.

5. The double walled vessel of claim 2 wherein said double walled vessel is an insulated drinking vessel.

6. The double walled vessel of claim 1 wherein said inner vessel is a pre-molded component having a top portion, said outer vessel is a pre-molded component having a top portion, said inner vessel and said outer vessel being joined together by a weld joint at said top portions thereof to form a pre-molded unitary structure having a top edge portion which may include a vestige of a molding gate used to mold at least one of said inner and outer vessels, said ring comprising a plastic material molded in-situ on said top edge portion of said pre-molded unitary structure to cause said plastic material of said ring to fuse together and intermingle with said plastic material of said pre-molded unitary structure to form a non-superficial homogenous joint eliminating the visible appearance of said vestige.

7. The double walled vessel of claim 6 wherein said weld joint comprises an annular projection located within an annular recess.

8. The double walled vessel of claim 6 wherein said weld joint comprises a far-field ultrasonically welded joint.

9. The double walled vessel of claim 6 wherein said double walled vessel is an insulated drinking vessel.

10. A method for making a double walled vessel comprising:
    a) providing an outer vessel comprising a separate pre-molded component formed of a plastic material;
    b) providing an inner vessel;
    c) providing a ring, wherein either one of said inner vessel and said ring comprises a separate pre-molded component formed of a plastic material and being referred to as a second separate pre-molded component, and wherein the remaining one of said inner vessel and said ring which is not a separate pre-molded component being referred to as a final stage component; and
    d) fixedly securing said outer vessel and said second separate pre-molded component together by a weld joint to form an integral unit, said final stage component being molded in situ on either of said outer vessel or said second separate pre-molded component to cause portions thereof to melt and intermingle to form a non-superficial homogenous joint therebetween, said ring forming a lip of said double walled vessel.

11. The method of claim 10 wherein said outer vessel has a top edge portion, wherein said ring is pre-molded of a plastic material and has a bottom edge portion, and wherein said method comprises molding said inner vessel in-situ on said bottom edge portion of said ring to cause the plastic material thereof to fuse together and intermingle with said plastic material of said ring to form a non-superficial homogenous joint at a bottom edge portion of said ring, and fixedly securing said top edge portion of said outer vessel to a bottom edge portion of said ring by a weld joint.

12. The method of claim 11 wherein said bottom edge portion of said ring includes a vestige of a molding gate used to form said ring and wherein the formation of said homogenous joint eliminates the visible appearance of said vestige.

13. The method of claim 11 wherein said weld joint comprises an annular projection located within an annular recess.

14. The method of claim 11 wherein said weld joint comprises a far-field ultrasonically welded joint.

15. The method of claim 11 wherein said double walled vessel is an insulated vessel, wherein said inner vessel comprises a sidewall and said outer vessel comprises a sidewall and said sidewall of said inner vessel is separated from said sidewall of said outer vessel by an insulating space.

16. The method of claim 10 wherein said outer vessel has a top edge portion, wherein said inner vessel is pre-molded of pre-molded of a plastic material and has a top portion, and wherein said method comprises fixedly securing said top edge portion of said inner vessel to said top edge portion outer vessel by a weld joint to form a unitary structure having a top edge portion which may include a vestige of a molding gate used to mold at least one of the inner and outer vessels, and molding said ring in-situ on said top edge portion of said pre-molded unitary structure to cause the plastic material of said ring to fuse together and intermingle with said plastic material of said pre-molded unitary structure to form a non-superficial homogenous joint.

17. The method of claim 16 wherein said bottom edge portion of said ring includes a vestige of a molding gate used to form said ring and wherein the formation of said homogenous joint eliminates the visible appearance of said vestige.

18. The method of claim 16 wherein said weld joint comprises an annular projection located within an annular recess.

19. The method of claim 16 wherein said weld joint comprises a far-field ultrasonically welded joint.

20. The method of claim 14 wherein said double walled vessel is an insulated vessel, wherein said inner vessel comprises a sidewall and said outer vessel comprises a sidewall and said sidewall of said inner vessel is separated from said sidewall of said outer vessel by an insulating space.

\* \* \* \* \*